(12) United States Patent
Armistead (10) Patent No.: US 10,001,615 B2
(45) Date of Patent: Jun. 19, 2018

(54) CONNECTOR PART OF A CONNECTOR UNIT

(71) Applicant: Siemens Aktiengesellschaft, Munich (DE)

(72) Inventor: Robert Armistead, Ulverston (GB)

(73) Assignee: Siemens Aktiengesellschaft, Munich (DE)

( * ) Notice: Subject to any disclaimer, the term of this patent is extended or adjusted under 35 U.S.C. 154(b) by 0 days. days.

(21) Appl. No.: 15/419,441

(22) Filed: Jan. 30, 2017

(65) Prior Publication Data

US 2017/0242210 A1    Aug. 24, 2017

(30) Foreign Application Priority Data

Feb. 23, 2016    (EP) .................................... 16156898

(51) Int. Cl.
| | | |
|---|---|---|
| *G02B 6/44* | (2006.01) | |
| *H01R 13/523* | (2006.01) | |
| *H01R 13/629* | (2006.01) | |
| *H01R 43/26* | (2006.01) | |
| *G02B 6/38* | (2006.01) | |

(52) U.S. Cl.
CPC ......... *G02B 6/4427* (2013.01); *G02B 6/3816* (2013.01); *G02B 6/3831* (2013.01); *G02B 6/3893* (2013.01); *G02B 6/443* (2013.01); *H01R 13/523* (2013.01); *H01R 13/62933* (2013.01); *H01R 43/26* (2013.01); *G02B 6/3874* (2013.01)

(58) Field of Classification Search
CPC .. G02B 6/3816; G02B 6/3893; G02B 6/4427; H01R 13/523; H01R 13/62933; H01R 43/26
See application file for complete search history.

(56) References Cited

U.S. PATENT DOCUMENTS

| | | | |
|---|---|---|---|
| 6,929,404 B2 | 8/2005 | Jones et al. | |
| 7,618,198 B2 | 11/2009 | Baxter et al. | |
| 9,223,095 B2* | 12/2015 | Hodge | G02B 6/3881 |
| 9,564,717 B2* | 2/2017 | Whetstone | H01R 13/6683 |
| 9,677,587 B2* | 6/2017 | Changsrivong | F16B 17/00 |
| 9,690,052 B2* | 6/2017 | Toth | G02B 6/3816 |
| 9,742,139 B2* | 8/2017 | Small | H01R 43/26 |

(Continued)

FOREIGN PATENT DOCUMENTS

WO    9845899 A1    10/1998

OTHER PUBLICATIONS

EP Search Report dated Aug. 4, 2016, for EP patent application No. 16156898.5.

*Primary Examiner* — Daniel Petkovsek
(74) *Attorney, Agent, or Firm* — Beusse Wolter Sanks & Maire (57) ABSTRACT

A connector part of a connector unit having a connecting structure and a guiding assembly, wherein the connecting structure is moveable between at least two positions at least one of the at least two positions being a connection position and wherein the guiding assembly determines a movement of the connecting structure in the connection position. The guiding assembly has a first keyway, at least a second keyway and at least one key being engaged in the first keyway and the at least second keyway to bring the connecting structure in the connection position due to a movement of the key in the first keyway and the at least second keyway.

12 Claims, 3 Drawing Sheets

(56) References Cited

U.S. PATENT DOCUMENTS

| | | | |
|---|---|---|---|
| 2003/0048996 A1* | 3/2003 | Lowe | G02B 6/3887 |
| | | | 385/81 |
| 2004/0028342 A1 | 2/2004 | Jones et al. | |
| 2006/0128196 A1 | 6/2006 | McKinnon | |
| 2009/0080837 A1 | 3/2009 | Baxter et al. | |

* cited by examiner

FIG 1

CONNECTOR PART OF A CONNECTOR UNIT

CROSS REFERENCE TO RELATED APPLICATIONS

This application claims the benefit of European Application No. EP16156898 filed 23 Feb. 2016, incorporated by reference herein in its entirety.

FIELD OF INVENTION

The present invention relates to a connector part of a connector unit comprising a connecting structure and a guiding assembly. Further, the present invention relates to a connector unit comprising at least one of said connector part and additionally to a method for connecting a first connector part and an at least second connector part of said connector unit and to a use of the connector part in a subsea application.

ART BACKGROUND

In the near future an increasing demand for communication over wide distances, especially for example between continents will be needed. Hence, infrastructures, like sea cables and connectors linking sea cables and modules, e.g. subsea modules, like transformers, pumps etc. that are located and operated error proof in harsh environment, like subsea, will be essential. For example, within the oil and gas industry there is an increasing requirement for high performance subsea optical connectors.

Fibre optics are known to be used in subsea connectors. Such an optical fibre is capable of carrying large volumes of data reliably and with minimal interference (such as from electromagnetic sources that would potentially effect traditional electronic transmittal). Due to the size and fragile nature of the contacting faces of the fibre optic ferrules, they must be protected from harsh conditions. They are extremely susceptible to damage from particles being trapped between the mating faces. In state of the art connectors a connecting structure comprising the optical fibre is, for example, positioned in a protecting sleeve during the mate and is only exposed in a clean environment shortly before the initial contacting of the corresponding fibre. To shorten the overall length of the connector and to provide a connector with e.g. four connecting structures and four fibres, respectively, it is, for example, known to arrange the connecting axis off-centre and transversally from the centre axis of the connector. Therefore, there is the need to provide a mechanism to expose the connecting structure with the fibre accordingly. It is, for example, known from U.S. Pat. No. 6,929,404 B2 to hold the connecting structure in an angled orientation due to an angled mounting aperture in the protecting sleeve and to guide the connecting structure by the angled aperture during the mate to archive an off-centre connection position. To allow the connecting structure to travel in this position during the mate it is mounted in a keyway oriented perpendicular to the centre axis of the connector.

SUMMARY OF THE INVENTION

It is a first objective of the present invention to provide a connector part providing a guiding assembly for a connecting structure that ensures a controlled and reliable exposure and connecting mechanism for the connecting structure as well as a secure connected state of the connecting structure.

It is a further objective of the present invention to provide a connector unit that provides a reliable mating and de-mating mechanism and is failure proof as well as reliable.

It is still a further objective of the present invention to provide method that provides a failure proof mate and results in a reliable connected state of the connector unit and thus to provide a unit that can be operated reliably, safely and is less insusceptible to errors, in comparison to state of the art systems.

It is still another objective of the present invention to provide a use of the connector part that allows an application of the connector part that is subjected to high standard.

These objectives may be solved by a connector part, a connector unit, a method and a use according to the subject-matter of the independent claims as well as to the specification.

According to a first aspect of the present invention, a connector part of a connector unit comprising a connecting structure and a guiding assembly is provided, wherein the connecting structure is moveable between at least two positions at least one of the at least two positions being a connection position and wherein the guiding assembly determines a movement of the connecting structure in the connection position.

It is proposed, that the guiding assembly comprises a first keyway, at least a second keyway and at least one key being engaged in the first keyway and the at least second keyway to bring the connecting structure in the connection position due to a movement of the key in the first keyway and the at least second keyway.

Due to the inventive matter, a connector part can be provided that ensures that the connecting structure is exposed during the mate in a controlled and reliable way. This protects the integrated connecting element, like an optical fibre, and guarantees its failure proof operation. Furthermore, the mating of the connecting element with a corresponding connecting element can be performed in a precise way. Moreover, such an embodied guiding assembly is able to maintain the connected position of the connecting structure and the connected connecting elements, respectively, securely. Additionally, with this arrangement the connector part and thus the whole connector unit can be made compact and in a space saving manner. This ensures a safe, reliable and failure proof operation of the connector unit. Moreover, a chance of an unforeseen—e.g. optical—breakdown of the connector unit due to an uncontrolled, unreliable and even mismatched connection can be reduced. Hence, a system with less operational issues, compared with state of the art systems, may advantageously be provided.

Even if the terms "part, structure, assembly, position, keyway, key, arm, pivot element, kink, sleeve, shell, wire, fibre, shoulder or surface" (see also below) are used in the singular or in a specific numeral form in the claims and the specification the scope of the patent (application) should not be restricted to the singular or the specific numeral form. It should also lie in the scope of the invention to have more than one or a plurality of the above mentioned structure(s).

A connector unit is intended to mean a unit which physically connects at least two parts, like two cables, in particular subsea cables, or a cable with a—subsea—module (e.g. a transformer, a pump etc.) or a busbar inside of the module or two modules, respectively. Thus, it is advantageously a subsea connector unit. The connector unit may be used in any harsh environment and may be embodied as an optical or an electrical connector and/or penetrator or advantageously as a wet mateable connector/penetrator. Under a physically connects should be understood the use of any connection feasible for a person in the art, like optical, electrical or magnetical. However, it is advantageously employed in an optical application.

Such a connector unit comprises at least two mateable connector parts that in the embodiment as an optical connector unit each comprises at least one optical fibre, wherein the optical fibre of the first connector part and the optical fibre of the at least second connector part are embodied in such a way to establish an optical connection after a mate of the first and second connector part.

In case of the connector unit as an electrical connector unit the unit comprises at least a conductor part that helps to establish an electrical connection in a mated position of two connected parts, like two cables or a cable with a module.

The connector part may be a male part, in other words it comprises a pin, like a conductor pin, receptacle pin or male part of a connector or of a penetrator, or the connector part may be a female part, in other words it comprises an aperture e.g. to receive a pin of the male part and may be a socket contact of a female part, plug or socket or connector body of a connector for contacting a conductor pin of a male part. Thus, the connector part may be embodied as the male part and/or as the female part. This may also apply to the connector parts of the optical connector unit in case one optical fibre of the first connector part is embodied to pass into a body of the second connector part to connect with the optical fibre of the second connector part.

Hence, the female part is intended to mean a part of the connector unit with an opening, recess, bore or cavity to receive another part of the connector unit, like an optical fibre. Moreover, in case of an embodiment of the connector unit as comprising a penetrator one optical fibre is permanently connected to a cable or a module via a housing.

A connecting structure is intended to mean the structure or element that comprises the connecting element, like the electrical wire or contact or the optical fibre, and that is being manipulated to establish the respective physical connection. Moreover, the guiding assembly is intended to mean a piece or an assembly of parts that manipulates or guides the connecting structure and thus the connecting element from a first position or spatial arrangement into at least a second position or spatial arrangement. Hence, the guiding assembly provides the means for a movement pattern or path of the connecting structure.

A position of the connecting structure should be a spatial arrangement of the connecting structure at at least one selected state of the connector part during the mate or de-mate or in the mated or unmated position of the connector unit. The connecting structure might be in the same position at different states of the connector unit or part. One of the positions is the connected position, wherein connected position should be understood as the state where the connecting structure contacts a corresponding connecting structure. This position is established at least after the mate of two connector parts as well as in the mated state of the connector unit. The other or second position might be a starting position beforehand of the mate and thus the position of the connection structure in the unmated state of the connector unit (unconnected position) or any intermediate orientation of the connecting structure being established e.g. during the mate or de-mate or in the mated or unmated state of the unit.

In this context the term "determine" may be understood as bring, guide, influence or force. A keyway is intended to mean a structure, like an aperture with at least an edge, which provides a specifically selected path or course. Moreover, a key should be understood as a pin, stud or bolt. The wording "being engaged" should be understood as meshed with or as to passing through. Advantageously, the key is restrain-guided by both keyways. The dimensions and characteristics (like size, orientation, course etc.) of the keyways and the key are selecting in such a way so that their interaction with another determines the movement pattern of the connecting structure. The movement of the key itself is determined by the pattern of the keyways as well as their relative orientation or positioning toward each other. Advantageously, the movement or displacement of the key is a linear movement. To obtain a movement of the connecting structure the two keyways or the structures comprising the respective keyway are movable in respect towards each other.

According to a further aspect of the invention the connecting structure is embodied as a pivotable arm. Or in other words, the connecting structure is mounted on a pivot. Due to this an easily manipulatable structure can be provided. Moreover, the mounting of the connecting structure can be realised loss-proof. The course of at least one of the keyways and their positioning towards each other determine the moving pattern or direction or pivoting motion of the pivotable arm.

Further, the guiding assembly comprises a guiding element to provide a robust part for the guiding action. The guiding element may be embodied as any means suitable for a person skilled in the art, like a wall, a rod, or a sleeve. Advantageously, the pivotable arm comprises the first keyway and the guiding element comprises the at least second keyway. Thus, the keyways are positioned at different parts and a relative movement of the pivotable arm in respect to the guiding element can be realised easily. Beneficially, the pivot of the pivotable arm is arranged stationary in respect to the at least second keyway. Hence, the movement of the key in both keyways can be transferred easily into a pivoting motion of the connecting structure. In this context the term "stationary" should be understood as "fixed". That can be realised either by an arrangement of the pivot at the guiding element itself or by arranging the pivot at a further element that is fixed in respect to the guiding element. Advantageously, the pivot of the pivotable arm is connected to the guiding element or in other words the pivotable arm is mounted on the guiding element.

Furthermore, it is provided that the first keyway and the at least second keyway are embodied in such a way so that the key is guidable in both keyways so that a relative movement of the pivotable arm in respect to the guiding element occurs. Due to this the movement of the pivotable arm and thus the exposure of the latter can be realised conveniently. The specific embodiment of the keyways may be realised in any fashion suitable for a person skilled in the art. This might be done by selected courses of the keyways or by a specific spatial arrangement of the keyways to one another as well as in respect to the pivot. A person skilled in the art will select these features according to his knowledge in the art.

Advantageously, both keyways differ from one another advantageously in regard of their course, pattern or run, respectively. According to an advantage realisation of the invention it is provided that one keyway of the first keyway and the at least second keyway comprises at least one kink. Hence, two different moving orientations or patterns can be transferred to the pivotable arm. One of these orientations may transfer a non-movement of the pivotable arm or would keep the pivotable arm in one selected position, for example in its starting or end position. Moreover, it is provided that at least one section or segment of one keyway of the first keyway and the at least second keyway comprises at least one kink. Due to the at least one kink the keyway comprises at least two sections oriented differently e.g. in respect to the axis of the connector part. One section would be arranged beforehand of the kink and the other thereafter. This keyway may be also called an angled or activation keyway.

Advantageously, the activation keyway comprises at least two kinks or two section each comprising a kink and thus at least three sections with at least two different orientations. As states above, theses section can transfer different movements to the pivotable arm representing different actions of the pivotable arm. For example, one of the sections may transfer or trigger the pivotable movement of the pivotable arm. In an embodiment with three directions that would be the second section. The first and the last (in this exemplary case the third) section may represent resting or parking positions of the pivotable arm e.g. in the un-mated or mated state of the connector unit. Moreover, such a course of the keyway would advantageously provide a robustly locked pivotable arm before or after its movement. This would be even more secure if these sections would have a sufficient length to prevent the key to travel to early or back into the next or previous section e.g. due to disturbances, like vibrations or accidental pulling, acting on the connector unit.

Moreover, a course of one keyway of the first keyway and the at least second keyway is embodied straight or in other words is a straight keyway. Thus, this keyway is easy to manufacture. In this context straight should be understood as linear. Furthermore, the straight keyway has a greater length than its height providing at least in respect to the height of the keyway a space saving element.

According to a further aspect of the invention the keyway comprising at least one kink is arranged at the pivotable arm by which the intended movement can be transferred directly and efficiently to the pivotable arm. Further, the straight keyway is advantageously arranged at the guiding element. With this correlation of the keyways an especially compact connector part can be provided. Beneficially, the straight keyway is arranged basically in parallel to an axial axis of the connector part providing a course aligned with a mating direction of the connector unit. Advantageously, the keyways are formed in the respective element.

According to a still further aspect of the invention the pivotable arm is housed in the guiding element. Hence, the corresponding elements and thus the keyways are in close proximity to interact easily with each other. In this context "housed" is intended to mean, that at least a part of the pivotable arm is located inside the guiding element. Advantageously, the pivotable arm is arranged at least in one state, advantageously its resting state, basically inside of the guiding element, wherein basically should be understood as at least 75% of the volume of the pivotable arm are arranged inside the guiding element. This can be realised easily when the guiding element is embodied as a sleeve. Since, the pivotable arm pivots when activated by the interaction of the key with the keyways the guiding element or the sleeve, respectively, comprises an aperture to allow the pivotable arm to exit the interior of the guiding element or the sleeve, respectively.

The pivot of the pivotable arm may be positioned at any suitable location of the arm. However, to provide a compact construction as well as a compact fit of the pivotable arm in the guiding element, the pivot of the pivotable arm is positioned at a rear end of the pivotable arm. In this context rear means an end of the arm arranged away from a mating end of the connector part.

Due to a further realisation of the invention the guiding assembly further comprises an outer shell providing a further interacting as well as a protecting element. Advantageously, the outer shell houses the guiding element which—in turn—houses the pivotable arm. Hence, a compact and space saving arrangement is provided. In an advantageously embodiment of the invention the outer shell comprises the key. By this an activation of the movement or displacement of the key can be activated easily by engaging the outer shell. The key is advantageously attached or formed integrally with an inner surface of the outer shell.

For the interaction with a corresponding structure at a second connector part during the mate the outer shell comprises at least one interacting element, advantageously embodied as a shoulder, advantageously, extending around a circumference of the outer shell and radially outward. Generally, it would also be possible to let the key pass through the wall of the outer shell to the outside of the shell to interact with the corresponding structure. The outer shell may be embodied as any structure feasible for a person skilled in the art, like a wall, a rod, a box or advantageously, the outer shell is a sleeve. Due to this the shapes of the interacting elements are matched to one another.

In a further aspect of the invention the connecting structure guides at least one electrical and/or optical wire. Hence, the connecting element will be moved with the connecting structure or the pivotable arm, respectively, and consequently exposed to interact or mate with at least one corresponding connecting element of the second connector part of the connector unit. In this context an optical wire is intended to mean an optical fibre. The optical fibre is a part of a ferrule that may be of any type or construction feasible for a person skilled in the art. In the following text the terms optical fibre and ferrule are used as synonyms. Thus, it would be possible to use a multi-fibre-optical ferrule or to use an "individual" ferrule that e.g. houses only one optical fibre which is aligned with another ferrule using a split sleeve and is not gender specific. Moreover, a number of optical fibres can be selected according to the needed specifications of the connector unit and can be any number feasible for a person skilled in the art. Hence, it is also possible to employ one ferrule with more than one optical fibre, e.g. 12 or 24, or several ferrules, e.g. 8 or more, with just one optical fibre.

According to a further aspect of the invention a connector unit comprising at least one beforehand described first connector part and at least a second connector part is provided. It is proposed that the first connector part comprises at least one interacting element to interact at least during a mate of the first connector part and the at least second connector part with the at least one second connector part to trigger a movement of a connecting structure of an guiding assembly of the first connector part.

Due to this, the movement of the connecting structure can be activated easily and advantageously be triggered by the mate of the first connector part and the at least second connector part.

As stated above and advantageously, the interacting element is arranged at the outer shell of the first connector part and is advantageously embodied as at least one shoulder. Due to the connection to the outer shell the mating force can be transferred directly to the key. Moreover a shoulder can provide a sufficient contact surface providing a stable interaction and if the shoulder extends radially outward and around the circumference of the outer shell (sleeve) a homogenous and balanced transfer of the mating force.

According to a further aspect of the invention a method to connecting a first connector part and an at least second connector part of a connector unit is provided. It is proposed that the method comprises at least the steps of: Pushing the first connector part into the at least second connector part and consequently connecting at least one shoulder at an outer shell which comprises the at least one shoulder and a key with the at least second connector part and thus by further pushing the first connector part into the at least second connector part, moving the key of the outer shell that is engaged in a first keyway and an at least second keyway resulting in a movement of a connecting structure in its connection position.

Due to this, the movement of the connecting structure can be activated easily and advantageously be triggered by the mate of the first connector part and the at least second connector part. Moreover, the mating force can be transferred directly to the key via the shoulder of the outer shell. The concept of "pushing the first connector part into the at least second connector part" should also cover the vice versa situation, specifically, the concept of "pushing the at least second connector part onto the first connector part.

According to an advantageous realisation of the invention and as stated above the method comprise the step of: Activating the movement of the connecting structure by the mate of the first connector part with the at least second connector part. Consequently, a further step or special means can be omitted saving pieces and mounting time.

According to a still further aspect of the present invention a use of the connector part in a subsea application is proposed. Hence, a reliable connector part can be applied in an environment where high security standards are essential.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

The illustrations in the drawings are schematically. It is noted that in different figures, similar or identical elements are provided with the same reference signs.

Figure 1:
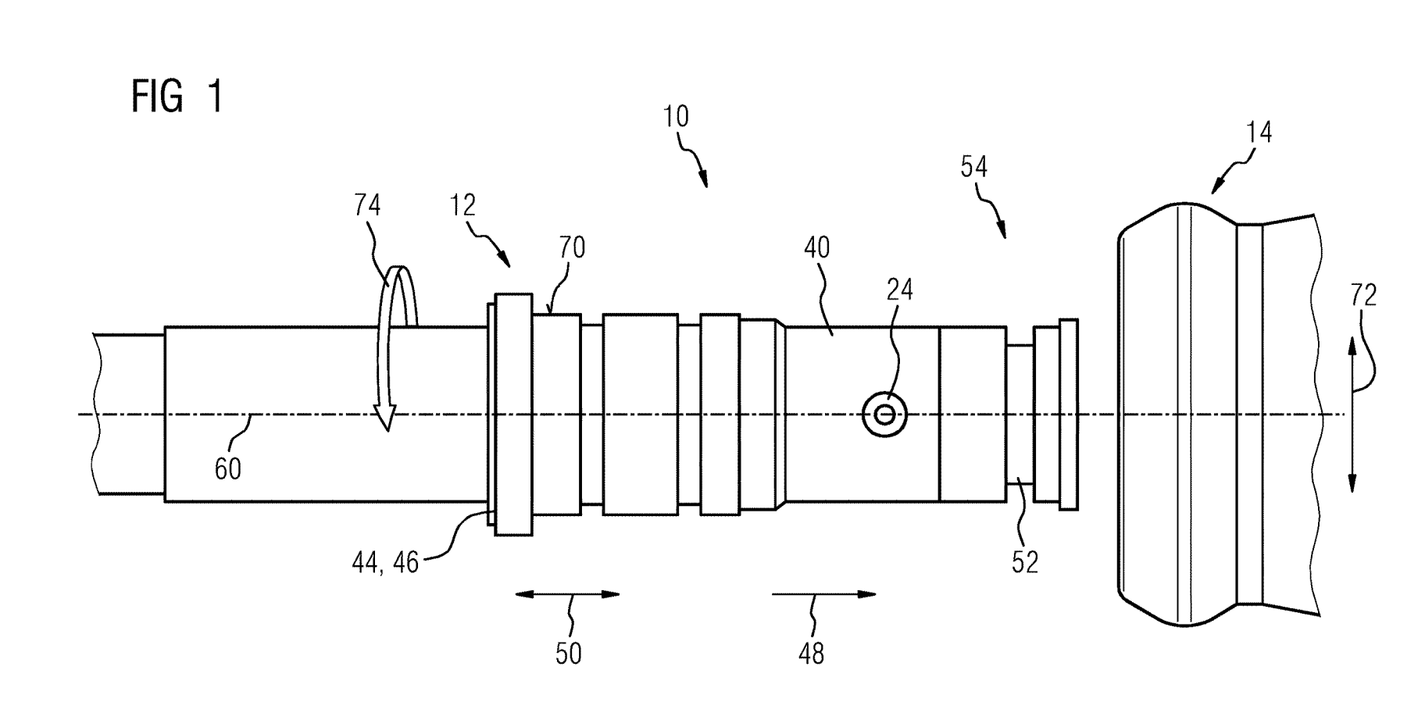
FIG. 1: shows schematically two connector parts of a connector unit in an unmated position in a side view.

FIG. 1 shows a wet mateable subsea optical connector unit 10 for connecting two connected parts, like two subsea cables (not shown), wherein the connector unit 10 comprises two connector parts 12, 14 in the form of a first or a male part 12 (receptacle/pin) and a second or a female part 14 (plug) that are embodied in such a way to establish a physical and specifically an optical connection after a mate of the male part 12 and the female part 14. The connector parts 12, 14 are intended for a use in a subsea application.

The male connector part 12 is embodied as a pin and the female connector part 14 has a not specifically shown opening to receive the male connector part 12 during a mate of the connector parts 12, 14 in mating direction 48 that is coaxial to an axial direction 50. At a forward end 52 of the pin the male connector part 12 comprises a mating region 54 having a connecting element 56 in the form of a ferrule with at least one optical wire 42 or optical fibre, respectively (not shown). During the mate of the connector part 12, 14 the connecting element 56 of the male connector part 12 contacts a not shown connecting element in the female connector part 14 to establish the optical connection. Alternatively or additionally, the connecting element may be embodied as or with an electrical wire.

Figure 2:
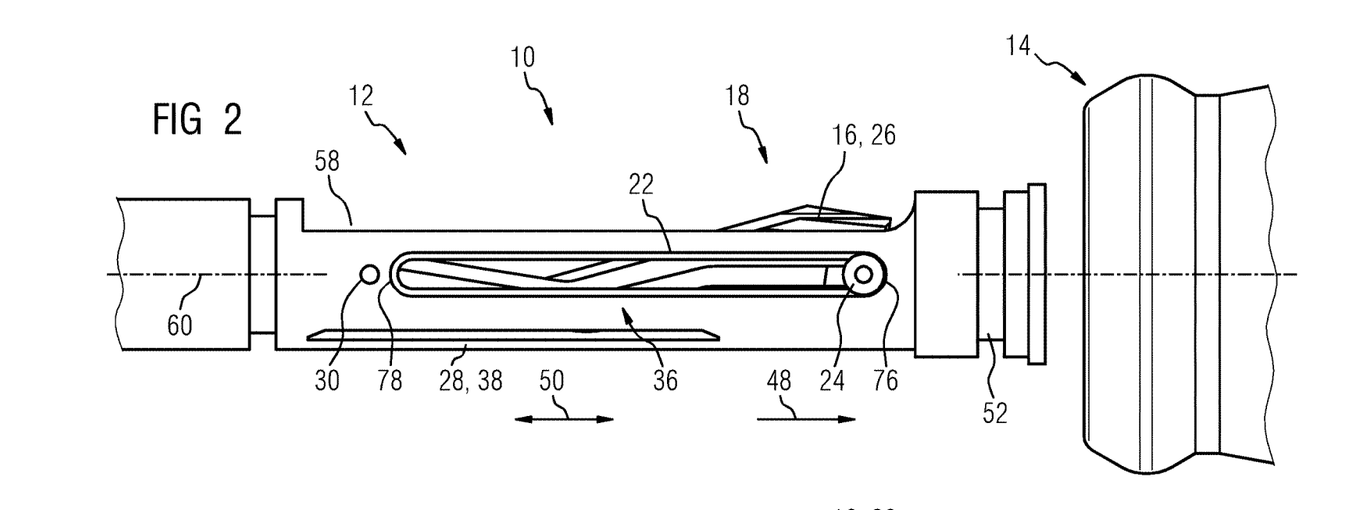
FIG. 2: shows a connecting structure of one of the connector parts from FIG. 1 housed in a guiding element of a guiding assembly.
Figure 3:
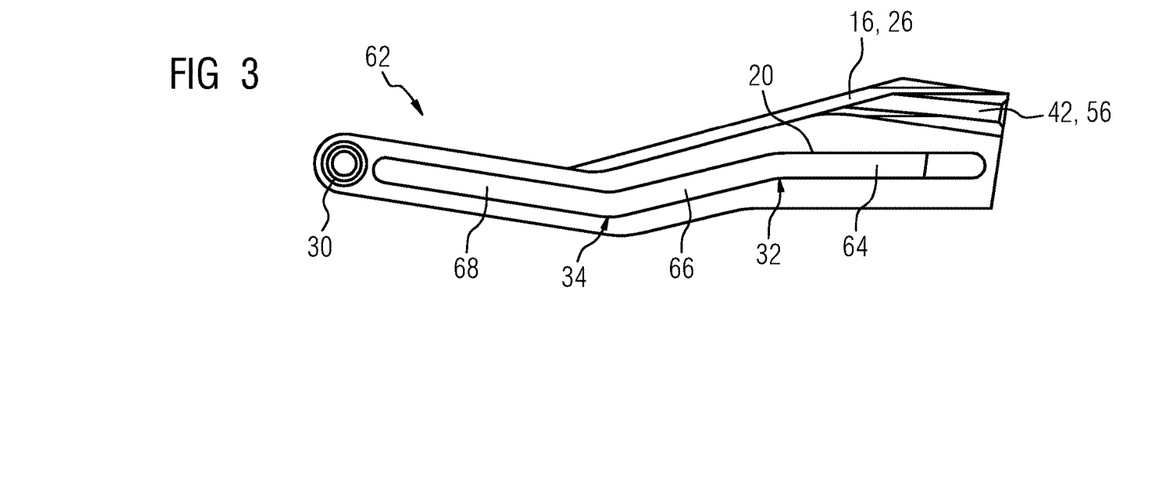
FIG. 3: shows the connecting structure of FIG. 2 in greater detail.

To perform, assist and control the mate of the connecting elements 56 the male connector part 12 comprising a connecting structure 16 and a guiding assembly 18 which are shown in FIGS. 2 and 3 and will be described below with reference to these figures. The connecting structure 16 guides the optical wire 42 (not shown). The guiding assembly 18 of which the connecting structure 16 is a part of is arranged or housed in an outer shell 40 embodied as a sleeve. The in FIG. 1 shown male connector part 12 is further encompassed by an outer housing (not shown).

The guiding assembly 18 is shown in more detail in FIG. 2 in which for better representability the outer shell 40 is removed. The guiding assembly 18 comprises a guiding element 28 embodied as a sleeve 38. The connecting structure 16 is housed in the guiding element 28 or sleeve 38, respectively, and is embodied as a pivotable arm 26. A pivot 30 of the pivotable arm 26 is connected to the guiding element 28. To allow the connecting structure 16 or the pivotable arm 26, respectively, to exit the guiding element 28 or be raised out of the guiding element 28 the latter comprises an aperture 58. This aperture 58 extends basically axially long a length of the guiding element 28 or it has at least basically a same length than the pivotable arm 26 to allow its freedom to move.

The connecting structure 16 is moveable between two positions. One position is a resting or parking position in an unmated state of the connector unit 10 in which the connecting structure 16 is basically positioned inside the guiding element 28 (see FIG. 2). The other position is a connection position in a mated state of the connector unit 10 in which the connecting structure 16 is arranged in a raised configuration outside of the guiding element 28 (see FIG. 5). The guiding assembly 18 determines the movement of the connecting structure 16 or the pivotable arm 26, respectively, from the resting position to the connection position.

To facilitate the controlled movement the guiding assembly 18 comprises a first keyway 20, a second keyway 22 and a key 24 being engaged in the first keyway 20 and the second keyway 22. Due to a movement of the key 24 in the first keyway 20 and the second keyway 24 the connecting structure 16 can be brought in the connection position.

The guiding element 28 of the guiding assembly 18 comprises the second keyway 22, wherein a course 36 of the second keyway 22 is embodied straight. In other words, the straight keyway 22 is arranged at the guiding element 28. The straight keyway 22 is basically an elongated hole extending along the length of the guiding element 28 and basically coaxial to an axis 60 of the connector part 12.

As can be seen in FIG. 3 the connecting structure 16 or the pivotable arm 26, respectively, comprises the first keyway 20. This keyway 20 comprises a course 62 with two kinks 32, 34 or in other words the keyway 20 with the two kinks 32, 34 is arranged at the pivotable arm 26. The keyway 20 is subdivided by the two kinks 32, 34 in three sections 64, 66, 68, wherein the first section 64 and the last (third) section 68 represent or maintain stop or resting positions of the pivotable arm 26 either in the unmated or the mated state of the connector unit 10. The second section 66 mediated the movement of the pivotable arm 26. As can be seen in FIG. 1 the outer shell 40 or an inner surface of the outer shell 40 comprises the key 24 (The key 24 is shown in hedged lines). Moreover, to allow the pivotable arm 26 to be raised by the interaction of the key 24 with the keyways 20, 22 the pivot 30 of the pivotable arm 26 is arranged stationary in respect to the second keyway 22.

The first keyway 20 and the second keyway 22 are embodied in such a way so that the key 24 is guidable in both keyways 20, 22 so that a relative movement of the pivotable arm 26 in respect to the guiding element 28 occurs. In other words, the courses 36, 62 and shapes as well as the orientation of the keyways 20, 22 towards each other are specifically selected to result in the controlled raising of the pivotable arm 26.

To trigger the movement of a connecting structure 16 or to activate the pivoting motion or the raising of the pivotable arm 26 the male connector part 12, respectively, comprises an interacting element 44 to interact during the mate of the male connector part 12 and the female connector part 14 with a corresponding interacting element of the female connector part 14 (not shown). The shoulder 46 is arranged at the outer shell 40 or an outer surface 70 of the outer shell 40, respectively, and is embodied as a shoulder 46 extending in radial direction 72 outward from the outer surface 70 and in circumferential direction 74 around the outer shell 40.

Figure 4:
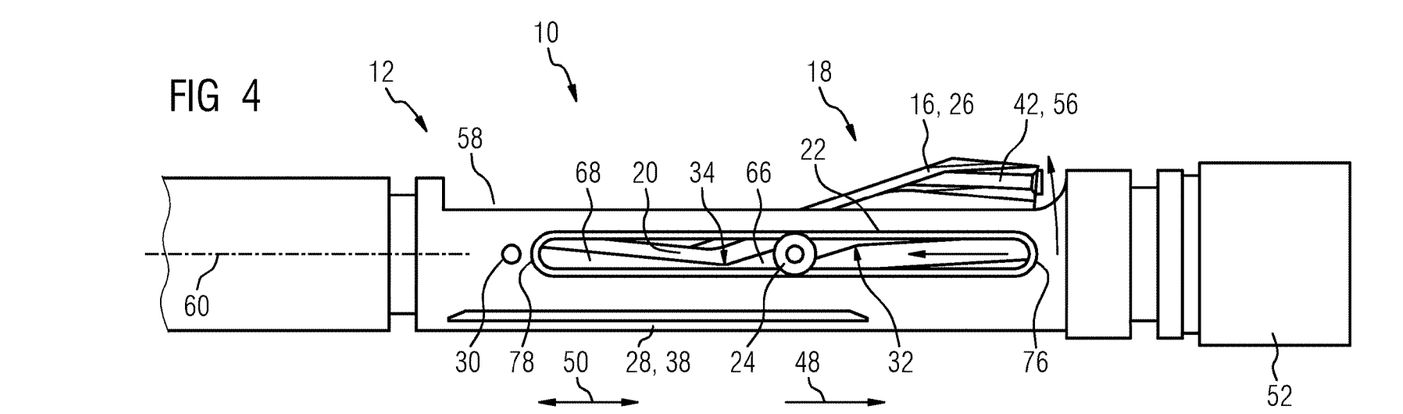
FIG. 4: shows the parts of FIG. 3 during a mate of the two connector parts with a partly raised connecting structure
Figure 5:
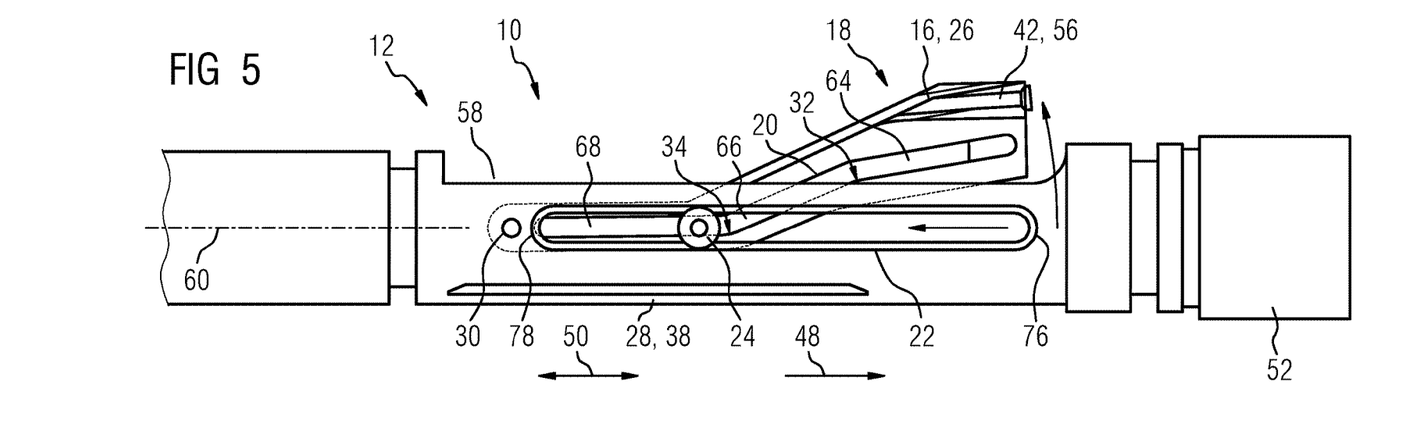
FIG. 5: shows the parts of FIG. 3 after the mate of the two connector parts with a fully raised connecting structure.

With respect to FIGS. 2, 4 and 5 the mating sequence will be described in the following text:

In the unmated state of the connector unit 10 the pivotable arm 26 is positioned inside the guiding element 28 in a basically axial orientation. The key 24 is positioned at an end 76 of the straight keyway 22 being arranged at the forward end 52 of the male connector part 12 (see FIG. 2). When the connector parts 12, 14 engage or when the male connector part 12 is pushed into the female connector part 14 the shoulder 46 at the outer shell 40 which comprises the shoulder 46 and the key 24 connects with the female connector part 14 or its corresponding interacting element (not shown).

By further pushing the male connector part 12 into the female connector part 14, the outer shell 40 and thus the key 24 is moved backwards or against mating direction 48, respectively. Since the key 24 is engaged in the first activation keyway 20 and the second straight keyway 22 its movement resulting in a movement of the connecting structure 16 or the pivotable arm 26, respectively, in its connection position (see FIG. 5).

Specifically, when the key 24 travels the first section 64 of the activation keyway 20 the pivotable arm 26 still rests in its axial or resting position. After crossing the kink 32 the key 24 travels along the second section 66 of the keyway 20 and consequently, the pivotable arm 26 is raised gradually (see FIG. 4) and finally reaching its fully raised connecting position (see FIG. 5). At an end of section 66 the key 24 crosses kink 34 and reaches the third section 68 of the keyway 20. When the key 24 travels the third section 68 of the activation keyway 20 till the key 24 reaches a backward end 78 of the straight keyway 24 the pivotable arm 26 still rests securely in its connecting position (not shown). Hence, due to the interaction of the key 24 with the keyways 20, 22 the pivotable arm 26 changes its spatial arrangement from a basically axial orientation to a transversal orientation or angled orientation in respect to the axis 60 of the connector part 12.

Under a mated condition, the force of the second female connector part 14 moving forward and being retained maintains the position of the outer shell 40. The de-mating process of the connector unit 10 is accomplished in the reverse, wherein the outer shell 40 and thus the key 24 is pushed back by a spring acting on the shoulder 46 (not shown).

A connector unit 10 with the aforementioned embodiments makes efficient use of volume, due the advantageous nature of making a compact connector. This can be realized in that the pivotable arm 26 (which contains the ferrule or the connecting element 56, respectively) is folded within the guiding element 28 of the male pin when the connector unit 10 is unmated. During the mating procedure, the pivotable arm 26 lift clear of the guiding element 28 in order to allow the connecting element 56 to mate the opposite the connecting element within the female connector part 14 or the plug half of the connector unit 10. Due to this special guiding assembly 18 the pivotable arm lifts in a controlled way to ensure that the connecting element 56 is not damaged through unintended contact with internal components, whilst simultaneously being brought into line with the opposite connecting element 56 at the correct stage of the mating sequence.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A first connector part, comprising:
a guiding assembly comprising a guiding element and a connecting structure disposed within the guiding element,
wherein the connecting structure is pivotable between a connection position and a retracted position, wherein when in the connection position the connection structure pivots out of the guiding element relatively more than when in the retracted position,
wherein the guiding assembly comprises a first keyway, a second keyway, and a key engaged in both the first keyway and the second keyway, wherein movement of the key from a first location in the second keyway to a second location in the second keyway moves the key from a first location in the first keyway associated with the retracted position to a second location in the first keyway associated with the connection position.

2. The first connector part according to claim 1,
wherein the connecting structure is embodied as a pivotable arm.

3. The first connector part according to claim 2,
wherein the pivotable arm comprises the first keyway, the guiding element of the guiding assembly comprises the second keyway, and a pivot of the pivotable arm is arranged stationary with respect to the second keyway.

4. The first connector part according to claim 3,
wherein the guiding element comprises a sleeve.

5. The first connector part according to claim 3, wherein the pivot of the pivotable arm is connected to the guiding element.

6. The first connector part according to claim 2, wherein the guiding assembly further comprises an outer shelf, wherein the guiding element is disposed within the outer shell, and wherein the key is secured to the outer shell.

7. The first connector part according to claim 1, wherein of the first keyway comprises a bend and a straight course, and wherein the second keyway is straight.

8. The first connector part according to claim 7, wherein the first keyway is disposed in the connecting structure, and wherein the second keyway disposed in the guiding element.

9. The first connector part according to claim 1, wherein the connecting structure guides at least one of an electrical wire and an optical wire.

10. A connector unit, comprising:
the first connector part according to claim 1, and a second connector part,
wherein the first connector part further comprises an interacting element to interact with the second connector part during a mate of the first connector part and the second connector part, and wherein the interaction causes the key to move from the first location in the first keyway to the second location in the first keyway, thereby moving the connecting structure from the retracted position to the connection position during the mate.

11. The connector unit according to claim 10, wherein the first connector part comprises an outer shell that comprises the interacting element, wherein the interacting element is arranged at the outer shell, and wherein the interacting element is embodied as a shoulder.

12. A method for connecting the first connector part and the second connector part of the connector unit according to claim 10,
wherein the guiding assembly comprises an outer shell that moves relative to the guiding element, wherein the interacting element comprises a shoulder disposed on the outer shell, and wherein the key is secured to the outer shell,
the method comprising:
pushing the first connector part into the second connector part and contacting the shoulder with the second connector part and then further pushing the guiding element into the second connector part while the outer shell is prevented from being pushed further into the second connector part by the contact of the shoulder with the second connector part,
wherein movement of the outer shell relative to the guiding element moves the key that is secured to the outer shell from the first location in the first keyway to the second location in the first keyway, thereby resulting in a movement of the connecting structure into the connection position.

* * * * *